US009722870B2

United States Patent
Rattner et al.

(10) Patent No.: US 9,722,870 B2
(45) Date of Patent: Aug. 1, 2017

(54) LOCALITY AND TIME BASED DEPENDENCY RELATIONSHIPS IN CLUSTERS

(71) Applicant: Oracle International Corporation, Redwood Shores, CA (US)

(72) Inventors: Martin H. Rattner, Los Altos, CA (US); Nicholas A. Solter, Colarado Springs, CO (US); Bharath Venkatakrishnan, Chicago, IL (US); Hariharan Kolam Govindarajan, Stony Brook, NY (US); Gia-Khanh Nguyen, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 14/543,665

(22) Filed: Nov. 17, 2014

(65) Prior Publication Data
US 2015/0074252 A1    Mar. 12, 2015

Related U.S. Application Data

(62) Division of application No. 11/777,184, filed on Jul. 12, 2007, now Pat. No. 8,918,490.

(51) Int. Cl.
*G06F 15/173*     (2006.01)
*H04L 12/24*      (2006.01)
(Continued)

(52) U.S. Cl.
CPC .......... *H04L 41/0816* (2013.01); *G06F 11/20* (2013.01); *H04L 41/0668* (2013.01);
(Continued)

(58) Field of Classification Search
CPC ............. H04L 41/0893; H04L 41/0816; H04L 43/0817; H04L 41/0668; H04L 67/16; G06F 11/20; G06F 11/202; G06F 11/142
See application file for complete search history.

(56) References Cited

U.S. PATENT DOCUMENTS 5,666,486 A    9/1997    Alfieri et al.
6,401,120 B1   6/2002    Gamache et al.
(Continued)

OTHER PUBLICATIONS

Kolam, Hairharan et al., "Implementation of offline-restart flavor of dependency in High Availability Clusters," Research Disclosure Journal, Kenneth Mason Publications Ltd., Wesbourne, Hants UK, Sep. 29, 2006, 7 pages.

*Primary Examiner* — Oscar Louie
*Assistant Examiner* — James Forman
(74) *Attorney, Agent, or Firm* — Osha Liang LLP

(57) ABSTRACT

A method, apparatus, and system are directed toward configuring a dependency relationship between resources in a cluster. A dependency relationship between a dependent in a first resource group and a dependee in a second resource group is declared. The dependency relationship might include a locality based qualifier and/or a time based qualifier. The locality based qualifier includes a Local Node, Any Node, or From Resource Group Affinity relationship. The time based dependency qualifier includes a Strong dependency, Weak dependency, Online Restart dependency, or Offline Restart dependency. The declaration might be made using a graphical user interface, property list, configuration file, or the like. A candidate node on which to activate the first resource group is determined. The dependent is brought online on the candidate node based on whether an instance of the dependee is online on a node specified by the locality based qualifier.

8 Claims, 9 Drawing Sheets

(51) Int. Cl.
  *H04L 29/08* (2006.01)
  *G06F 11/20* (2006.01)
  *H04L 12/26* (2006.01)
  *G06F 11/14* (2006.01)

(52) U.S. Cl.
  CPC .......... *H04L 41/0893* (2013.01); *H04L 67/16* (2013.01); *G06F 11/142* (2013.01); *G06F 11/202* (2013.01); *H04L 43/0817* (2013.01)

(56) References Cited

U.S. PATENT DOCUMENTS

| | | | |
|---|---|---|---|
| 6,594,779 B1* | 7/2003 | Chandra | G06F 11/1438 714/15 |
| 6,725,261 B1* | 4/2004 | Novaes | G06F 11/006 709/201 |
| 7,383,383 B1 | 6/2008 | Bandopadhyay et al. | |
| 7,444,335 B1* | 10/2008 | Colrain | G06F 11/203 707/687 |
| 7,533,173 B2 | 5/2009 | Badovinatz et al. | |
| 2002/0049845 A1 | 4/2002 | Sreenivasan et al. | |
| 2002/0120597 A1 | 8/2002 | Bae | |
| 2002/0174379 A1 | 11/2002 | Korenevsky et al. | |
| 2005/0005200 A1 | 1/2005 | Matena et al. | |
| 2005/0198022 A1 | 9/2005 | Chang | |
| 2006/0034263 A1* | 2/2006 | Outhred | G06F 9/465 370/352 |
| 2006/0085785 A1 | 4/2006 | Garrett | |
| 2006/0090095 A1 | 4/2006 | Massa et al. | |
| 2006/0265414 A1 | 11/2006 | Loaiza et al. | |
| 2007/0226359 A1 | 9/2007 | Gunduc et al. | |
| 2008/0243866 A1 | 10/2008 | Pandey | |

* cited by examiner

FIG. 6

LOCALITY AND TIME BASED DEPENDENCY RELATIONSHIPS IN CLUSTERS

CROSS-REFERENCE TO RELATED APPLICATIONS

This application is a divisional application of U.S. patent application Ser. No. 11/777,184, filed on Jul. 12, 2007, and entitled: "Locality and Time Based Dependency Relationships in Clusters." Accordingly, this application claims benefit of U.S. patent application Ser. No. 11/777,184 under 35 U.S.C. §121. U.S. patent application Ser. No. 1114/777,184 is Hereby incorporated by reference in its entirety.

TECHNICAL FIELD

The present invention relates generally to network communications, and more particularly, but not exclusively, to managing dependency relationships between resources in a cluster.

BACKGROUND

Clustering of computer systems is becoming an increasingly popular way for enterprises and large businesses to ensure greater availability to multiple users. Different types of clusters have evolved, including high availability (HA) clusters, high performance clusters, load balanced clusters, and the like. Example of clustering systems include the Veritas™ Cluster Server, HP Serviceguard, and/or Microsoft Cluster Server. High Availability clusters are a class of tightly coupled distributed systems that provide high availability for applications typically by using hardware redundancy to recover from single points of failure. HA clusters typically include multiple nodes that interact with each other to provide users with various applications and system resources as a single entity. Each node typically runs a local operating system kernel.

In the event of a hardware or software failure, the HA cluster automatically restarts applications on the same node or "fails over" (e.g., restarts applications on a different node) the applications in order to keep applications available to clients of the cluster. Conventionally, the cluster software is responsible for starting/restarting applications on one or more nodes of the cluster.

Individual software components on the HA cluster are configured as resources or services. A resource or service might be any component that is capable of readily being relocated from one node to another node. Typical examples of resources or services include disk volumes, network addresses, software processes, or the like. A group of resources or services that run together on the same node is known as a resource group or service group.

Often a resource or service might require the services of another resource or service. For example, a software application might require a disk volume. Such dependencies typically have been managed in an ad-hoc method, and such management might not be able to provide fine-grained control over dependencies between resources or services. It is with respect to this consideration and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIGS. 6-7 illustrates examples of embodiments of graphical user interfaces for managing dependency relationships between resources in a cluster.

DETAILED DESCRIPTION

Figure 1:
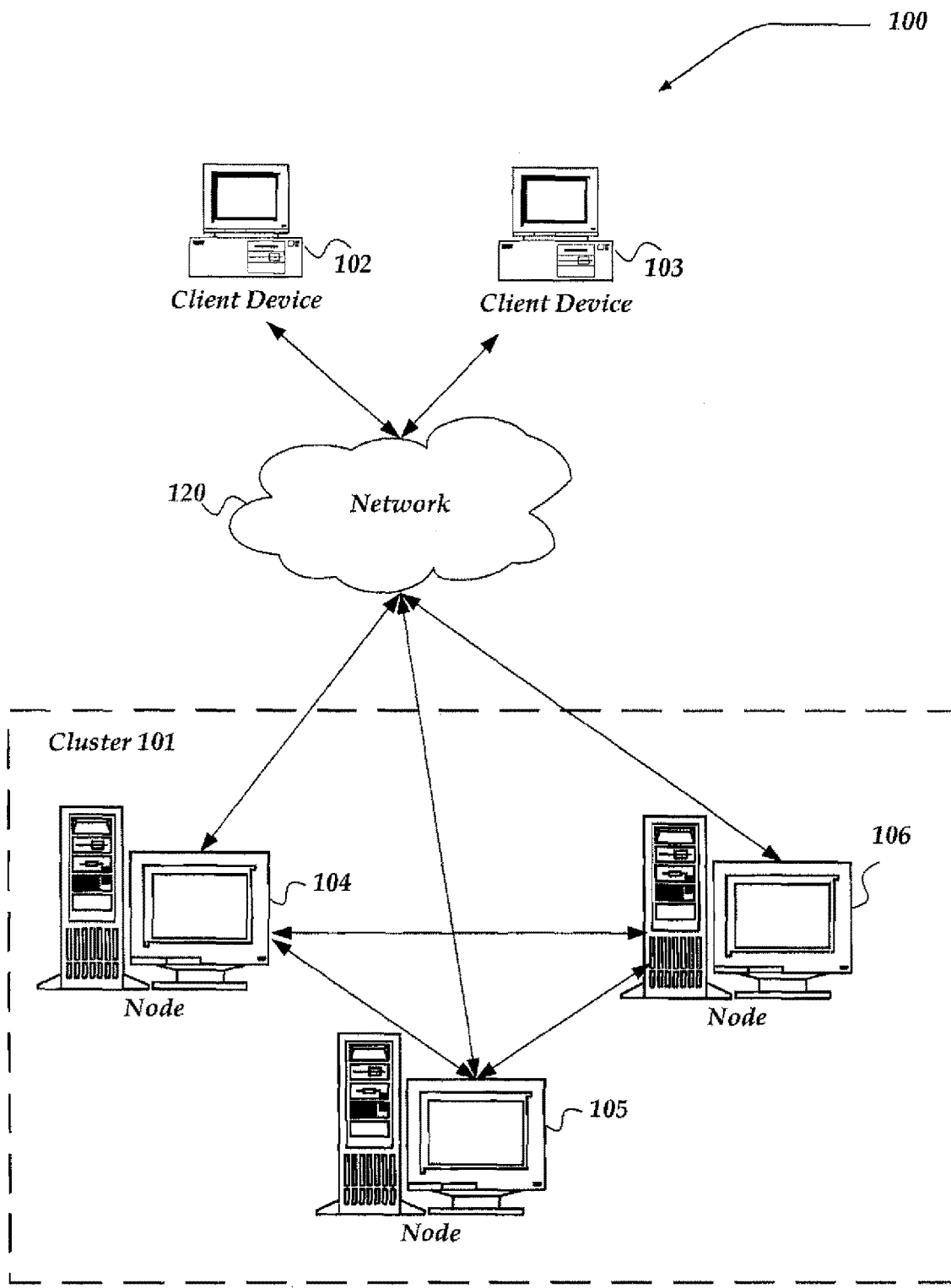
FIG. 1 shows a block diagram illustrating one embodiment of an environment for practicing the invention.

The invention now will be described more fully hereinafter with reference to the accompanying drawings, which form a part hereof, and which show, by way of illustration, specific exemplary embodiments by which the invention might be practiced. This invention might, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention might be embodied as methods or devices. Accordingly, the invention might take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it might. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection might be a TCP connection. TCP connections are virtual connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication.

The term "node" refers to a computing element that is one logical part of a network. A node might be a virtual operating environment or virtual machine. Examples of virtual cluster nodes include Solaris™ containers or zones, IBM™ virtual machines, Solaris™ Logical Domains (LDOMs), Xen™ domains, VMware™ "virtual machines" or the like. In one embodiment, a node might be connected to other nodes within a network. A node might be a physical device (i.e., a physical node), such as a computer, or the like, or a virtual operating environment running on a physical device (i.e., a virtual node).

As used herein, the term "resource" refers to any component that is capable of readily being relocated from one node to another node. Resources might include disk volumes, network addresses, software processes, or the like. The term "resource group" refers to any group or collection of resources that run together on the same node. An "instance" of a resource refers to an actual execution of a resource on a particular node.

A resource group is considered "online" if at least one instance of every enabled resource in the resource group is currently running, is otherwise available, or is in the process of being activated or started on a particular node. Conversely, a resource group is "offline" if every instance of every resource in the resource group is no longer available on a particular node or is in the process of being deactivated or stopped on the particular node. A resource (or an instance of the resource) is "online" on a particular node if the instance of the resource is active or running on the particular node. Conversely, a resource (or an instance of the resource) is "offline" if the instance is no longer running or available on the particular node.

Additionally, the node on which a resource group is online is considered the "master" of that resource group. A resource and/or a resource group might also be "multi-mastered" or "single mastered." A multi-mastered resource/resource group might have several instances of the resource/resource group run on several nodes. Whereas, a single mastered resource runs on a single node at a time.

As used herein, the term "dependency relationship" refers to an indication that one resource is to act in a particular manner based on the state of another resource. A resource that is dependent on the state of another resource is called a "dependent resource" or simply "dependent." A "dependee resource" or simply "dependee" is the resource upon which the other resource depends. Dependency relationships are generally directed and acyclic. In other words, the relationships between resources might form a directed acyclic graph (i.e., there are no cycles, and the relationships are one-way).

As used herein, the term "declaring" refers to encoding and/or storing information in a physical form, such as on a computer readable medium. Declaring a relationship refers to encoding and storing information about a relationship, such as the identity of a dependent, a dependee, a relationship type, or the like. The declaration might use any mechanism, including a user interface, a configuration file, a property list, a database, or the like.

Briefly stated, the present invention is directed towards configuring a dependency relationship between resources in a cluster. A dependency relationship between a dependent in a first resource group and a dependee in a second resource group is declared. The dependency relationship might include (or be specified by) a locality based qualifier and/or a time based qualifier. The locality based qualifier includes a Local Node, Any Node or From Resource Group Affinity relationship, or the like. The time based qualifier includes a Strong dependency, Weak dependency, Online Restart dependency, Offline Restart dependency, or the like. The declaration might be made using a graphical user interface, property list, configuration file, or the like.

A candidate node on which to activate the first resource group might also be determined. The dependent is brought online on the candidate node based on whether an instance of the dependee is online on a node specified by the locality based qualifier. The dependee might be brought offline on a node based on whether all instances of the dependent are offline on nodes specified by the locality based qualifier. However, the invention is not limited to this embodiment. For example, in another embodiment, a dependee might go offline if the dependent on that local node is offline.

Resource Group Affinity relationships are described in more detail in U.S. patent application Ser. No. 10/803,023, entitled "Implementation of Affinities in High Availability Clusters," filed Mar. 17, 2004, and is incorporated herein by reference.

Illustrative Operating Environment

FIG. 1 illustrates one embodiment of an environment in which the invention might operate. However, not all of these components might be required to practice the invention, and variations in the arrangement and type of the components might be made without departing from the spirit or scope of the invention. As shown in the figure, system 100 includes client devices 102-103, network 120, and nodes 104-106. As shown, nodes 104-106 participate in cluster 101. In one embodiment, cluster 101 might be a high availability (HA) cluster, a high performance cluster, a load balanced cluster, or the like.

Generally, client devices 102-103 might include virtually any computing device capable of connecting to another computing device to send and receive information, including web requests for information from a server device, or the like. The set of such devices might include devices that typically connect using a wired communications medium such as personal computers, multiprocessor systems, microprocessor-based or programmable consumer electronics, network PCs, or the like. The set of such devices might also include devices that typically connect using a wireless communications medium such as cell phones, smart phones, radio frequency (RF) devices, infrared (IR) devices, integrated devices combining one or more of the preceding devices, or virtually any mobile device. Similarly, client devices 102-103 might be any device that is capable of connecting using a wired or wireless communication medium such as a PDA, POCKET PC, wearable computer, or any other device that is equipped to communicate over a wired and/or wireless communication medium.

Client devices 102-103 might further include a client application that is configured to manage various actions. Moreover, client devices 102-103 might also include a web browser application that is configured to enable an end-user to interact with other devices and applications over network 120.

Client devices 102-103 might communicate with network 120 employing a variety of network interfaces and associated communication protocols. Client devices 102-103 might, for example, use various dial-up mechanisms with a Serial Line IP (SLIP) protocol, Point-to-Point Protocol (PPP), any of a variety of Local Area Networks (LAN) including Ethernet, AppleTalk™, WiFi, Airport™, or the like. As such, client devices 102-103 might transfer data at a low transfer rate, with potentially high latencies. For example, client devices 102-103 might transfer data at about 14.4 to about 46 kbps, or potentially more. In another embodiment, client devices 102-103 might employ a higher-speed cable, Digital Subscriber Line (DSL) modem, Integrated Services Digital Network (ISDN) interface, ISDN terminal adapter, or the like.

Network 120 is configured to couple client devices 102-103, with other network devices, such as nodes 104-106, or the like. Network 120 is enabled to employ any form of computer readable media for communicating information from one electronic device to another. In one embodiment, network 120 might include the Internet, and might include local area networks (LANs), wide area networks (WANs), direct connections, such as through a universal serial bus (USB) port, other forms of computer-readable media, or any combination thereof. On an interconnected set of LANs, including those based on differing architectures and protocols, a router might act as a link between LANs, to enable messages to be sent from one to another. Also, communication links within LANs typically include twisted wire pair or coaxial cable, while communication links between networks might utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 120 might further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks might enable wide area coverage for network devices, such as client devices 102-103, or the like, with various degrees of mobility. For example, network 120 might enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 120 includes any communication method by which information might travel between one network device and another network device.

Additionally, network 120 might include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, or other wired media and wireless media such as, but not limited to, acoustic, RF, infrared, or other wireless media.

One embodiment of a network device that could be used as nodes 104-106 is described in more detail below in conjunction with FIG. 3. Briefly, however, nodes 104-106 might include any computing device capable of communicating packets to another network device. Each packet might convey a piece of information. A packet might be sent for handshaking, i.e., to establish a connection or to acknowledge receipt of data. The packet might include information such as a request, a response, or the like. Generally, packets received by nodes 104-106 might be formatted according to TCP/IP, but they could also be formatted using another transport protocol, such as SCTP, UDP, NetBEUI, IPX/SPX, token ring, similar IPv4/6 protocols, or the like. Moreover, the packets might be communicated between nodes 104-106 and client devices 102-103 employing HTTP, HTTPS, RTSP, or any of a variety of current or later developed protocols.

In one embodiment, nodes 104-106 might be configured to operate as a website server. However, nodes 104-106 are not limited to web server devices, and might also operate a messaging server, a File Transfer Protocol (FTP) server, a database server, content server, or the like. Additionally, each of nodes 104-106 might be configured to perform a different operation.

Devices that might operate as nodes 104-106 include personal computers, desktop computers, multiprocessor systems, microprocessor-based or programmable consumer electronics, network PCs, server devices, or the like.

As shown, cluster 101 includes nodes 104-106. Cluster 101 is a collection of devices that operate together to provide various services. As shown, nodes 104-106 might communicate with each other. When cluster 101 is booted (e.g., the nodes of cluster 101 are initially started) and following any type of failure that takes a resource group offline (i.e., the resource group is no longer running on the node), at least one resource group is started on one or more available nodes to make at least one resource available to clients (e.g., client devices 102-103 over network 120).

Resources in resource groups might be dependent on resources in the same resource group or another resource group. Resource dependencies might include components (e.g., properties, associations) that describe the dependencies. For example, typical components might include the category of the dependency, the location of the dependency, the type of dependency, other qualifiers, or the like. Moreover, these components might be further defined with specific details (e.g., specific locations, types, or categories), which might add to the complexity of the dependencies. In one embodiment, a clustering software uses an algorithm to satisfy all the dependencies when activating a particular resource group on a given node. If this is not possible, services of the resource group might remain offline.

Figure 2A:
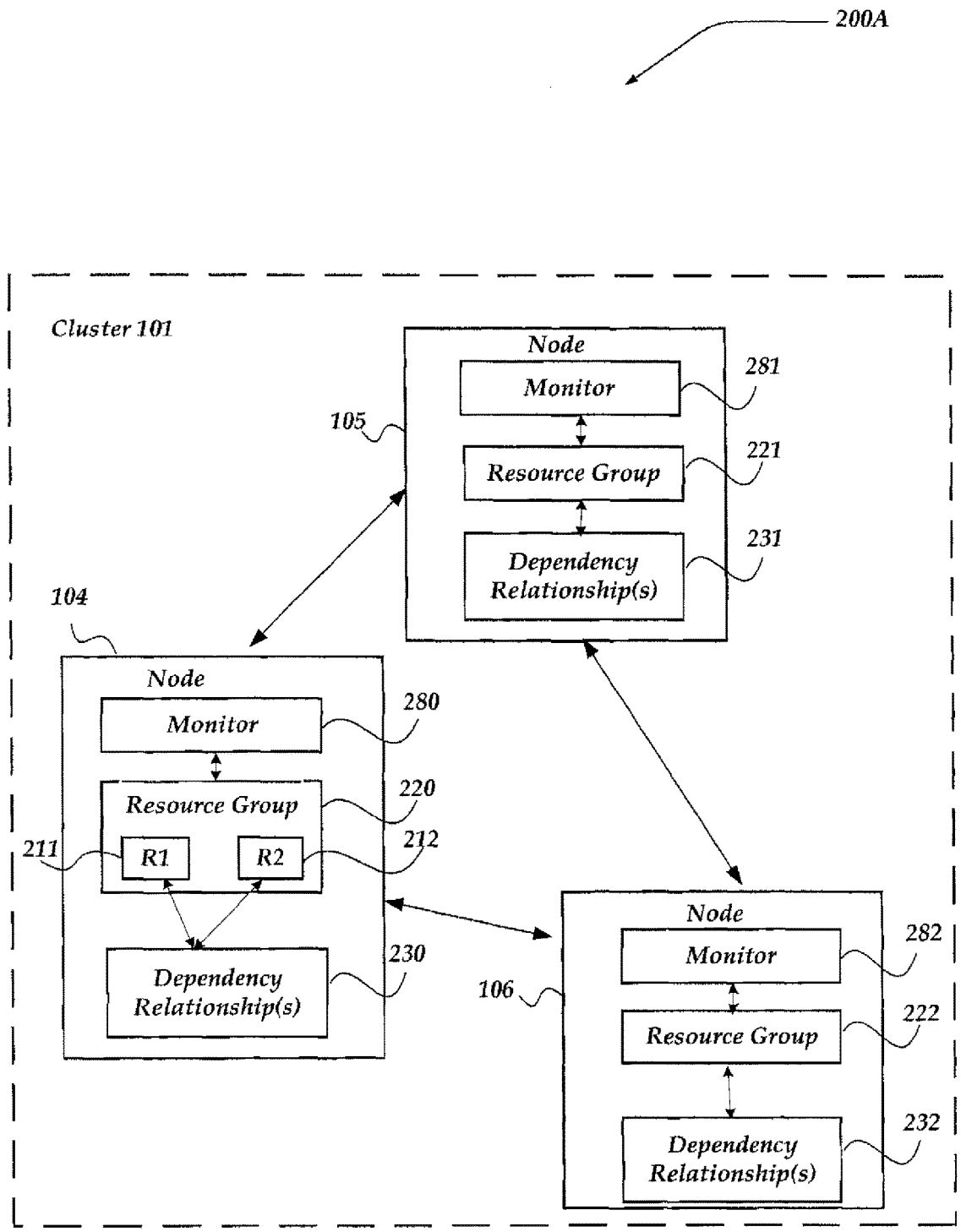
FIGS. 2A and 2B show block diagram, illustrating different embodiments of details of cluster environments for practicing the invention.
Figure 2B:
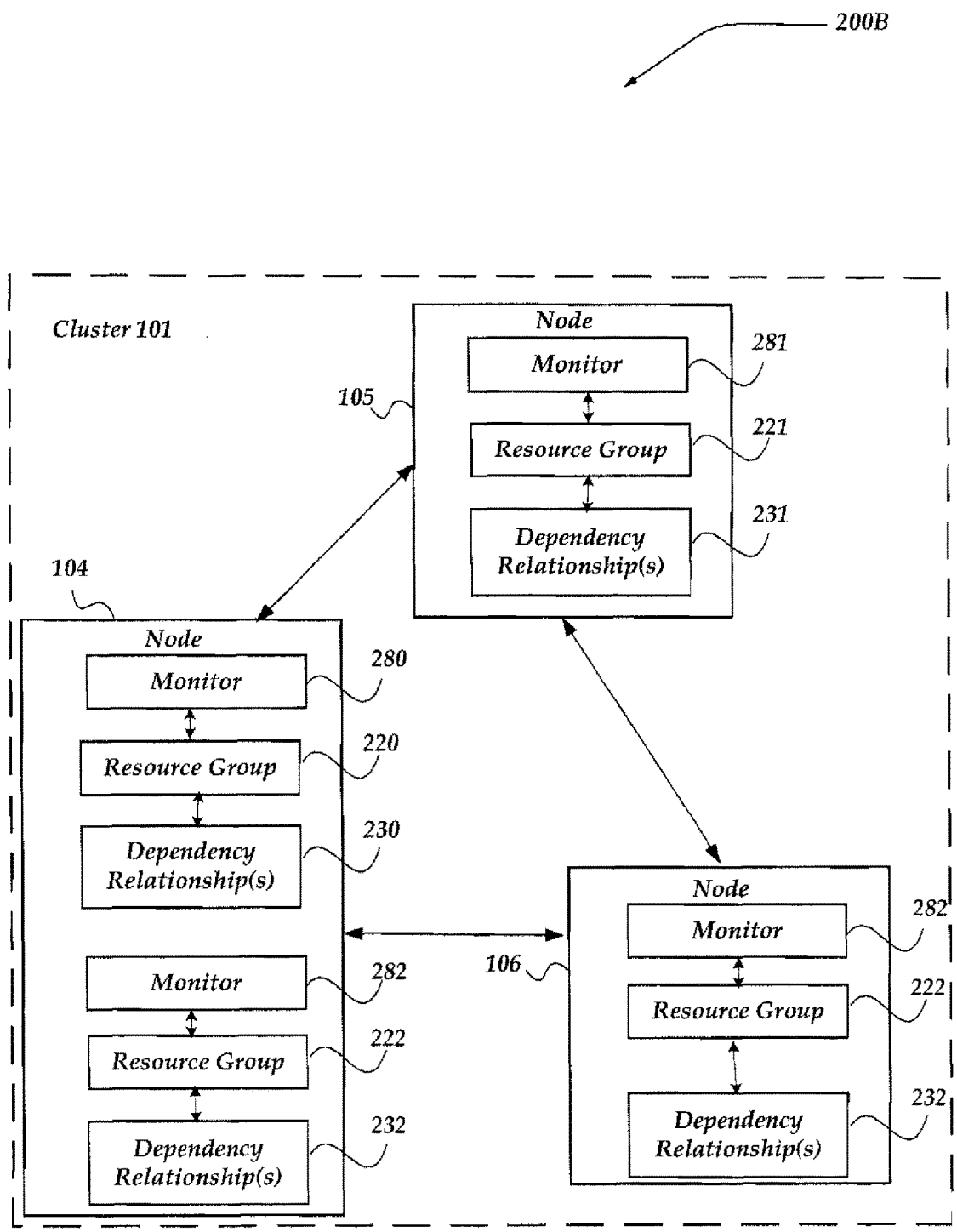

FIGS. 2A and 2B show system diagrams of embodiments of details of components of a cluster in accordance with one embodiment of the invention. As shown, the system 200A includes multiple nodes (e.g., nodes 104-106). While three nodes are shown, more or fewer nodes might be used without departing from the scope of the invention. Nodes 104-106 might have resource groups that run on the nodes. For example, node 104 includes resource group 220 with various resources that run together on the node 104. Resource group 220 might also provide one or more services to users of the cluster. Node 104 might include, for example, resources R1 211 and R2 212 within resource group 220. Although not shown, resource groups 221-222 also include resources. Resource groups may also be associated with at least one monitor, such as a monitors 280-282 to monitor the resources/resource groups. As shown, dependency relationships 230-232 are associated with the resources included in the resource groups. For example, dependency relationship 230 declare relationship(s) for R1 211 and R2 212, between R1 211 and R2 212, and/or other resources included in resource groups 221-222. In one embodiment, resource groups 220, 221, and 222 might include several properties such as a nodelist, a resource group name, a resource group description, a "failover" policy (e.g., a policy that states whether to restart a resource group on a different node once the resource group has failed on the current node), or the like.

Resources such as those in resource groups 220, 221, and 222 might be brought online or offline under varying circumstances. The resource groups might be brought online when booting/starting servers in cluster 101, when a user or a policy determines that a resource is to be started on a node, upon restarting of a resource, or the like. The resource groups might be brought offline when cluster 101 is shut down, by a user or a policy, upon restart, failover, or the like.

In one embodiment, a particular monitor, such as monitor 280 might initiate a failover of its resource group when one of the services within the resource group fails or cannot make itself available to users. As shown, each resource and/or resource group might be associated with a monitor (e.g., monitors 280-282), which might be a separate process that monitors the activity of the service(s) provided by the resource. When the resource group is activated on a node, a resource and a monitor for each resource in each resource group are also activated. A failover is typically invoked if one of the monitors detects that the service provided by a particular resource (within the resource group) is unhealthy, has failed, or has hung, the service provided is showing performance degradation, or the like. In one embodiment, a monitor may request a resource group manager to initiate a fail-over. In order to restore the health of the service, the monitor might initiate a failover to restart the resource group on a different node. Thus, the failover might take a resource offline and then attempt to place the resource back online.

In one embodiment, dependency relationships 230-232 might specify which resource is dependent on which other resource, when dependency relationships 230-232 might be activated and what actions might take place if the relationships are activated (i.e., time based), and on which node the resource might be brought online or offline (i.e., locality based). Accordingly, a dependency relationship might have several characteristics (e.g., time based qualifiers, locality based qualifiers) that qualify the dependency relationship.

Dependency relationships 230-232 might indicate that a dependent is to be brought online (e.g., started or restarted) before a dependee. The dependent and the dependee might be in the same group or another group. For example, upon booting of cluster 101, a dependent in resource group 220 might not start until a dependee in resource group 221 has started. Dependency relationships 230-232 might indicate that a dependee should not be brought offline until the dependent is brought offline. For example, the dependee in resource group 220 should not be brought offline (e.g., stopped, restarted), until the dependent in resource group 221 is brought offline. Dependency relationships 230-232 might also indicate that if a dependee is to be brought offline, then the dependent is brought offline.

In general, there might be several types of time based dependency relationships. These dependency relationships might include a Strong dependency, Weak dependency, Online Restart dependency, Offline Restart dependency, or the like. Strong dependency indicates that the dependent should not start until after the dependee starts. Weak dependency indicates that the dependent should wait until the dependee starts, but if the dependee fails to start, the dependent may start anyway. The two types of restart dependencies, in addition to following the strong dependency semantics, indicate additional actions that might be taken after both the dependent and dependee have been brought online and while both of their resource groups remain online. The online restart dependency indicates that the dependent might be restarted after the dependee has stopped and restarted for any reason, for example, due to a failover. The offline restart dependency indicates that the dependent might be stopped immediately whenever the dependee is stopped, and might be started after the dependee starts again.

Several types of locality based dependency relationships might be available for a resource. These locality based dependency relationships include a Local Node dependency relationship, an Any Node dependency relationship, a From Resource Group Affinity (FRGA) dependency relationship, or the like. In general, a dependency relationship might be time based and locality based. For example, dependency relationships might include: Local Node (Strong or Weak) dependency, Local Node (Online or offline) Restart dependency, Any Node (Strong or Weak) dependency, Any Node (Online or Offline) Restart dependency, FRGA (Online or Offline) restart dependency, or the like.

When a dependency is a Local Node dependency, the scope of the dependency might be limited to a per-node basis. In other words, the dependent might wait for the dependee to start on the same node and/or same zone on which the dependent is waiting to start. In case of the two types of restart dependencies, the restart of the dependent is triggered on those nodes on which the dependee has been restarted (Online Restart) or is going to restart/stop (Offline Restart). Thus, if a dependee is brought offline on a particular node, the dependent on that node might not come up even though the dependee might be online on a different cluster node and/or zone. Referring to system 200A, in a possible situation, a dependent in resource group 220 might have a Local Node dependency on a dependee in resource group 222. Thus, the dependent might not be brought online on node 104, because the dependee is not online on node 104.

When a dependency is an Any Node dependency, the scope of the dependency might be cluster wide. In other words, the dependency might be satisfied if the resources are online on any node in the cluster. The dependent waits for the dependee to be brought online on any node before the dependent is brought online. The dependee waits for the dependent to be brought offline on every node before the dependee is brought offline. In another embodiment, if the dependee is offline (e.g., due to fail-over) and the time based dependency for the dependee is Offline Restart, the dependent might be brought offline no matter which node it is on. In case of Any Node Restart dependency, the restart of the dependent is triggered when the last instance of the dependee is going down (Offline Restart) or the first instance of the dependee is coming up (Online Restart). Referring to system 200A, a dependent in resource group 220 might start on node 104 if a dependee in resource group 222 has started on any node, including node 105.

A From Resource Group Affinity (FRGA) relationship specifies the dependencies based on affinities between the resource groups of the dependent and the dependee. It is understood that a FRGA relationship does not explicitly declare the locality (i.e., where a resource is started) of the dependency. Rather, the locality is derived from an associated Resource Group Affinities (RGA) property/relationship for the resource groups of the dependent/dependee. The RGA property/relationship might be declared for the resource group that contains the dependent resource, might be a property of the resource group, or the like In one embodiment, the RGA property/relationship might be stored as a separate entity from a locality qualifier.

In one embodiment, the RGA relationship indicates that cluster 101 should attempt to activate a given resource group on a node that is a current master of another resource group (positive affinity) or that the clustering software should attempt to locate the resource group on a node that is not a current master of another resource group (negative affinity).

A resource group affinity enables the possibility for changes in the state of the resource group of the dependee to impose changes upon the resource group of the dependent. For example, if resource group 220 has a strong positive affinity for resource group 221, and resource group 221 invokes a failover from node 105 to node 106, then resource group 220 also is relocated to resource group 221's node (i.e., node 106). Similarly, if resource group 220 has a strong negative affinity for resource group 221, and resource group 221 invokes a failover to node 104 (that is currently the master of resource group 220), then resource group 220 is relocated to a different node than resource group 221.

In the case where the locality type dependency is determined by an FRGA, if the dependent's resource group and the dependee's resource group define a strong positive affinity between them, then the dependent and the dependee share a Local Node dependency relationship. If the FRGA relationship is associated with an RGA that is not a strong positive affinity (e.g., a weak positive, a strong negative, a weak negative affinity), then the locality of the dependency relationship is determined to be an Any Node dependency.

While FIG. 2A shows a resource group for each node, a particular resource group might have more than one master (i.e., a resource group might be online on multiple nodes). Moreover, more than one resource group might be activated on the same node. For example, system 200B of FIG. 2B shows both resource group 220 and resource group 222 activated on node 104. Resource group 220 and resource group 222 might be activated on node 104 for a variety of reasons. In one embodiment, both resource groups 220 and 222 might include a preference to be activated on node 104. In another embodiment, it might be declared that resource 211 in resource group 220 depends on a resource in resource group 222 based on a Local Node dependency relationship. In yet another embodiment, it might be declared that resource 212 in resource group 220 depends on a resource in resource group 222 based on an Any Node dependency relationship. As shown, the resources 212 and 212 in resource group 220 will be activated because resource group 222 has been activated on node 104.

System 200B also shows resource group 222 as multi-mastered on both node 104 and node 106. As shown, a multi-mastered resource might be a single entity representing multiple instances of the resource which exist on each node. For example, resources from resource group 222 are multi-mastered on nodes 104 and 106. A dependency relationship might indicate that a dependent depends only on the same-node instance of the dependee. This relationship would be applicable if the dependent is either multi- or single-mastered while the dependee is multi-mastered or single-mastered.

For example, resource group 222 might provide a multi-mastered storage resource which manages the availability of a globally accessible storage device or file system, across multiple nodes of the cluster. As a multi-mastered resource group, the resource group 222 might be online on some nodes and offline on other nodes. The resource is online on nodes on which the storage is available, and offline on nodes on which the storage is not available.

A local node dependency relationship would also apply to a single-mastered dependee. In this case, the dependent might depend on the dependee starting on the same node as the dependent. For example, if resource R1 211 has a Local Node dependency on resource R3 (not shown); and if R1's resource group is starting on node 104; and R3's resource group is not online on node 104 (even if it is online on some other node 105), then R1 cannot start on node 104 and would remain offline. If R3's resource group later switched over to node 104, then the Local Node dependency would be satisfied and R1 would start at that time.

Other resources, such as resources in resource group 220, which depend on a resource in resource group 222, are configured to have a dependency on the resource in resource group 222. In this case, the dependency being satisfied on a non-local node would not provide the resource to the local node. For example, a dependee scalable storage resource in resource group 220 that is up on node 106 cannot provide I/O access to a resource dependent on the dependee on any node except node 106. Therefore, the dependency relationship between the dependent in resource group 220 and the dependee in resource group 222 might be configured to be a Local Node dependency. Those dependents/services on node 104 will not be started until the required dependee (e.g., underlying storage) is online and available on node 104.

In the above example, resource group 220 is a single-master resource. In that case, the failover resource might be configured to run on one node at a time, but might be dependent on the specific instance of the dependee (the scalable storage resource) on node 104, and would not depend on state of the dependee on any other node (e.g., node 106). In the case of a failover of resource group 220, resource group 220 might be restarted on node 106. Thus, in this case, based on the Local Node dependency relationship, the dependent will not begin on node 106 until the dependee begins on node 106.

In another embodiment, resource group 220 might be, instead, multi-mastered. In this embodiment, the dependent in resource group 220 might be brought online on node 106 after the dependee from resource group 222 is brought online one node 106. Thus, the instance of the dependent on node 104 depends on the instance of the dependee on node 104, and the instance of the dependent on node 106 depends on the instance of the dependee on node 106.

The ability to declare such a dependency relationship for systems 100, 200A, and/or 200B, or the like (e.g., a system with multi-mastered dependees) is directed to providing administrative ease of use, among other benefits.

Illustrative Network Device

Figure 3:
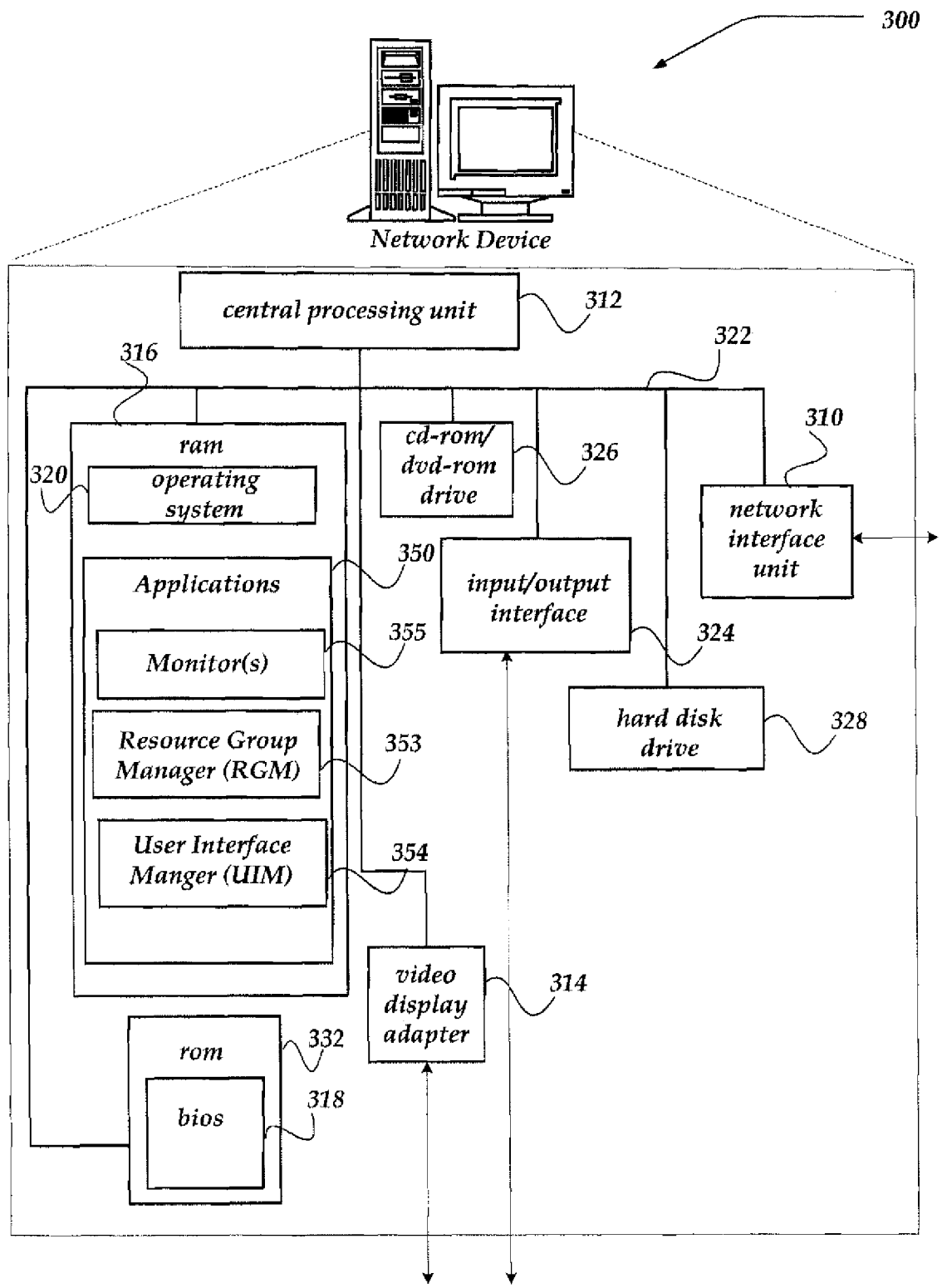
FIG. 3 illustrates one embodiment of a network device for managing dependency relationships between resources in a cluster.

FIG. 3 shows one embodiment of a network device, according to one embodiment of the invention. Network device 300 might include many more or less components than those shown. The components shown, however, are sufficient to disclose an illustrative embodiment for practicing one or more embodiments of the invention. Network device 300 might represent, for example, nodes 104-106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Network device 300 also includes applications 350, which might be expressed as one or more executable instructions stored at one or more locations within RAM 316, although the instructions could be stored elsewhere.

As illustrated in FIG. 3, network device 300 also can communicate with the Internet, or some other communications network via network interface unit 310, which is constructed for use with various communication protocols including the TCP/IP protocol. Network interface unit 310 is sometimes known as a transceiver, transceiving device, or network interface card (NIC).

The mass memory 316, 326, 328, 332 described herein and shown in FIG. 3 illustrates another type of computer-readable media, namely computer storage media. Computer storage media might include volatile, nonvolatile, removable, and non-removable media implemented in any method or technology for storage of information, such as computer readable instructions, data structures, program modules, or other data, which might be obtained and/or executed by CPU 312 to perform one or more portions of processes 400 and 500 shown in FIGS. 4 and 5, respectively, for example. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory might also store other types of program code and data as applications 350, which might be are loaded into mass memory and run on operating system 320. Examples of application 350 might include email client/server programs, routing programs, schedulers, calendars, database programs, word processing programs, HTTP programs, RTSP programs, traffic management programs, security programs, and any other type of application program.

Network device 300 might also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application might initiate communication with an external application in a secure fashion. Moreover, network device 300 might further include applications that support virtually any secure connection, including TLS, TTLS, EAP, SSL, IPSec, or the like.

Network device 300 might also include input/output interface 324 for communicating with external devices, such as a mouse, keyboard, scanner, or other input/output devices not shown in FIG. 3. Likewise, network device 300 might further include additional mass storage facilities such as CD-ROM/DVD-ROM drive 326 and hard disk drive 328. Hard disk drive 328 might be utilized to store, among other things, application programs, databases, or the like in the same manner as the other mass memory components described above.

User Interface Manager (UIM) 354 might include any component configured to manage a declaration of a characteristic/property of a resource group, a resource, a dependency relationship, or the like. UIM 354 might receive declared information (e.g., processor readable media) over network interface 310, input/output interface 324, or the like. A graphical user interface might be provided through video display adapter 314, or the like. In one embodiment, UIM 354 might receive at least one relationship from a graphical user interface, a property list, a configuration file, a configuration repository, a command line interface, or the like. In one embodiment, UIM might read the at least one relationship (e.g., using a disk read, socket based read, or the like). In one embodiment, UIM 354 might encode the at least one relationship on a processor readable medium (e.g., in RAM 316, drive 326, hard disk drive 328, or the like), wherein the at least one relationship includes information about the dependent, at least one dependee, a locality based relationship qualifier, or the like. In one embodiment, UIM 354 might declare an identity for every resource in the resource group, wherein an instance of every resource in the resource group is configured to be online on a same node. In one embodiment, a user such as a system administrator might configure the policy information for the dependencies of a resource in a resource group, using a user interface such as user interface 600 of FIG. 6 or 700 of FIG. 7, or the like. Using information from UIM 354, Resource Group Manager (RGM) 353 might further manage the cluster.

Monitor(s) 355 include any component configured to manage at least one resource. Monitor(s) 355 may be a process, hardware component, or the like. As described above in conjunction with FIGS. 2A and 2B, monitor(s) 355 may initiate fail-over of a resource on a node, by for example, requesting RGM 353 to bring a resource offline/online.

RGM 353 includes any component configured to manage at least one node and/or a cluster of nodes. In one embodiment, RGM 353 might manage every resource on network device 300. In one embodiment, RGM 353 might be a daemon started on every physical node of a cluster. This set of daemons might operate as a single logical entity. In one embodiment, a separate instance, version, thread, or the like, of RGM 353 might manage each resource on network device 300. In one embodiment, RGM 353 might be a distributed program. Several instances of RGM 353 might run on several network devices such a network device 300. One instance of RGM 353 might be the master or controller program. Different instances of RGM 353 might send messages to each other about, for example, when to start, stop, restart and/or fail-over a resource and/or resource group, when a resource and/or a resource group is offline or online, or the like. RGM 353 might also check if every relationship between every resource in a resource group and any other resource maintains a directed acyclic relationship.

To facilitate management of resource groups, information about the resource groups might be stored in media. Referring briefly to media 800A and 800B of FIGS. 8A and 8B, each resource group typically might be associated with a list of nodes, (i.e., a nodelist), upon which the resource group can run. In one embodiment, nodelist 806 is typically created in order of preference, with the most preferred node occurring first on the list. Nodelist 806 is one of several properties of a resource group (e.g., resource group 1). In one embodiment, a node might be declared as a virtual node, physical node, or the like. In one embodiment, dependency relationships 808-809 between two resources might be declared as a property of a resource in a resource group. Referring back to network device 300, the nodelist, the relationship information, or other resource information, might be stored, in for example, hard disk drive 328, RAM 316, or any other data repository.

In one embodiment, ROM 353 might determine whether a dependency relationship is satisfied for a resource. Based on whether the dependency relationship is satisfied, RGM 353 might bring the resource online or offline on a particular node. For example, in one embodiment, RGM 353 is the master RGM. RGM 353 receives a message that indicates that a dependee has been brought online on a node (e.g., network device 300). ROM 353 might then check all the dependency relationships of the dependee. These relationships might be stored in a database, or the like. If a dependent is found, then RGM 353 might check if all the dependees of the found dependent have all its dependency relationships satisfied (e.g., all other dependees have been brought online for the found dependent). If all of the found dependency relationships are satisfied, then RGM 353 might schedule or immediately bring the found dependent online. In one embodiment, the dependency relationships of the found dependent might be locality based. For example, the relationship might be a Local Node dependency. In this case, RGM 353 might check to see if all the relationships are satisfied for the particular node specified by the locality based relationship. For example, RGM 353 might check if all the dependees of the dependent have been brought online on network device 300, before bringing the dependent online.

In one embodiment, RGM 353 might receive declared information about a resource group (e.g., a property list, dependency relationship information, policy information, nodelist, or the like) over a network (e.g., network interface 310) from an administrative device outside of the cluster.

In one embodiment, RGM 353 might determine whether to bring resource groups and resources offline and online and might initiate failovers and restarts. When bringing a resource group online, RGM 353 might start each resource and each resource's monitor (e.g., one of monitor(s) 355) on a particular node. For example, RGM 353 might choose the node or nodes on which to start, stop, restart or otherwise manage the resource group, check dependency relationship, or the like. In one embodiment, RGM 353 might deny a failover request from a particular resource/monitor. In this case, an error might be returned to the resource and the failover process might not be completed or even started.

In one embodiment, RGM 353 might determine on which nodes to bring a resource group online, RGM 353 might base this decision upon factors such as the Nodelist order, resource group affinities that might be declared for that resource group, previous failure history of resources in that resource group, or the like. Once RGM 353 might determine to bring the group online on a particular node, it might run start methods to bring all of the enabled resources online. A resource will start if its dependencies are satisfied, but will not start (and will remain offline) if its dependencies are not satisfied. Resources which are disabled on that node might remain offline even if the resource group goes online. Resources that have unsatisfied non-weak dependencies on other resources might also remain offline.

In another embodiment, a resource group might be brought online that contains a disabled resource. An administrator might enable that resource, at which point the resource might immediately go online. A resource might be disabled on specific nodes. For a resource to go online on a particular node, the resource group is determined to be online on that particular node, the resource is determined to be enabled on that particular node, and the resource's non-weak dependencies is determined to be satisfied on that particular node. If these conditions are not met, the resource might remain offline.

In one embodiment of the invention, the administrator might explicitly request that a resource be brought online (e.g., on any node, multiple nodes, or on a particular node). If bringing the resource online on the node (e.g., on network device 300) violates a dependency requirement, then RGM 353 might issue an error message informing the system administrator why the action is not permitted. For example, the resource is a dependent, and the dependent might require a dependee to be started on the Local Node, and the dependee has not started. Subsequently, the administrator might try a different node, or the like.

Generalized Operation

Figure 4:
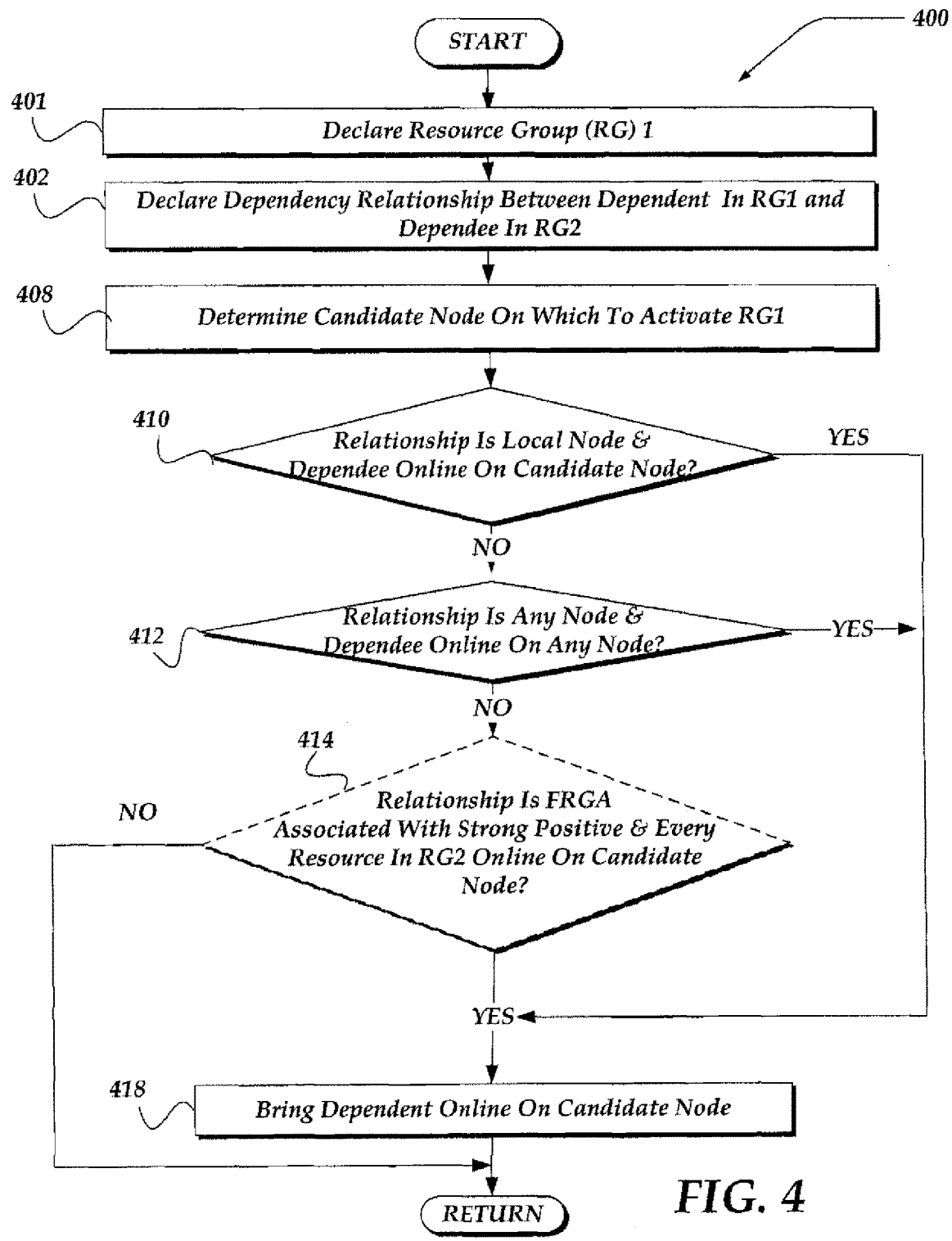
FIG. 4 illustrates a logical flow diagram generally showing one embodiment of a process for managing dependency relationships between resources in a cluster.

The operation of certain aspects of the invention will now be described with respect to FIGS. 4-5. FIG. 4 illustrates a logical flow diagram generally showing one embodiment of a process for managing dependency relationships in a cluster and for bringing a resource online. Process 400 of FIG. 4 might be implemented, for example, within nodes 104-106 of FIG. 1.

Process 400 begins, after a start block, at block 401, where a first resource group is declared. Various characteristics or properties of the first resource group might be declared though a user interface (e.g., a keyboard entry, pull-down list entry), a property list, a configuration file, a configuration repository, a command line interface, or the like. In one embodiment, characteristics might be encoded on a processor readable medium. Referring briefly to media 800A of FIG. 8A, a resource group might include a declared master mode 802. If master mode 802 is a multi-mastered mode, a resource of the resource group is configured to be online on a plurality of nodes in the cluster. If master mode 802 is a single-mastered mode, the resource is configured to be online on a single node in the cluster. Resourcelist 804 of the resource group might also specify resources included in the resource group. Each resource of resourcelist 804 might also be declared to be of a particular type (not shown), for example as a file system, an Internet Protocol (IP) address, an instance of an application, or the like. Nodelist 806 might specify the node(s) on which the resource group is configured to be brought online. Media 800A might be declared using, for example, user interface 600 of FIG. 6 and/or interface 700 of FIG. 7. For example, resources 604 might be entered through a keyboard entry for resource group 602. Referring back to process 400, processing next continues to block 402.

At block 402, a dependency relationship is declared between a dependent in the first resource group and a dependee in a second resource group. Accordingly, the dependent is defined as being dependent on the first dependee. The dependency relationship might be declared though a user interface (e.g., a keyboard entry, pull-down list entry), a property list, a configuration file, a configuration repository, a command line interface, or the like. Referring briefly to media 800B of FIG. 8B, a dependency relationship might be defined by a dependent, a dependee, and a locality based qualifier, and/or a time based qualifier. The locality based qualifier might be a Local Node, Any Node, From Resource Group Affinity (FRGA) dependency relationship, or the like. The time based qualifier might include Strong dependency, Weak dependency, Online Restart dependency, Offline Restart dependency, or the like. For example, dependency relationship 808 is declared as a local node dependency between dependent resource 1 and dependee resource 2. Dependency relationship 810 is declared as an Any Node Offline Restart dependency between dependent resource 3 and dependee resource 4, Media 800B might be declared using, for example, interface 600 of FIG. 6 and/or interface 700 of FIG. 7. For example, pulldowns 720-731 might declare locality based qualifiers for relationships between a dependent specified in textbox 702 and a dependee specified in column 778. Each relationship might further be specified as a different type of time based dependency in entry area 704, 706, 708 and 710. Referring back to process 400, processing next continues to block 408.

At block 408, a candidate node is determined on which to activate the first resource group. The candidate node might be determined by the properties of the first resource group (e.g., such as a preference to start on a particular node), by a user explicitly scheduling the first resource group to be brought online on the candidate node, or the like. Processing then continues to decision block 410.

At decision block 410, it is determined whether the dependency relationship is a Local Node relationship and the dependee is online on the candidate node. If the dependee is online on the candidate node, then it is determined that the Local Node dependency relationship is satisfied, and processing continues to block 418. Otherwise, processing continues to decision block 412.

At decision block 412, it is determined whether the dependency relationship is an Any Node relationship and the dependee is online on any node in the cluster. In one embodiment, if the dependee is brought online on any node, the Any Node relationship is determined to be satisfied and processing continues to block 418. Otherwise, processing continues to block 414.

At decision block 414, it is optionally determined whether the dependency relationship is a FRGA relationship associated with an RGA that is a strong positive affinity and if the dependee resource is online on the candidate node. If the determination is true then the FRGA relationship is determined to be satisfied, and processing continues to block 418. Otherwise, processing continues to other processing and/or loops back to decision block 410, 412, and/or 414 until one of these decision blocks is satisfied.

At block 418, the dependent is brought online or otherwise activated on the candidate node after all dependency relationships of the dependent are satisfied. In one embodiment, the dependent might be started, restarted, or failovered to the candidate node. While process 400 shows only one relationship being satisfied between the dependent and the dependee, one skilled in the art will readily understand that, in addition to locality based dependency relationships, any number of relationships and any types of relationship might be used within the scope of the invention. In this case, all relationships are satisfied as described above, before block 418 is processed. Processing then continues to other processing.

Figure 5:
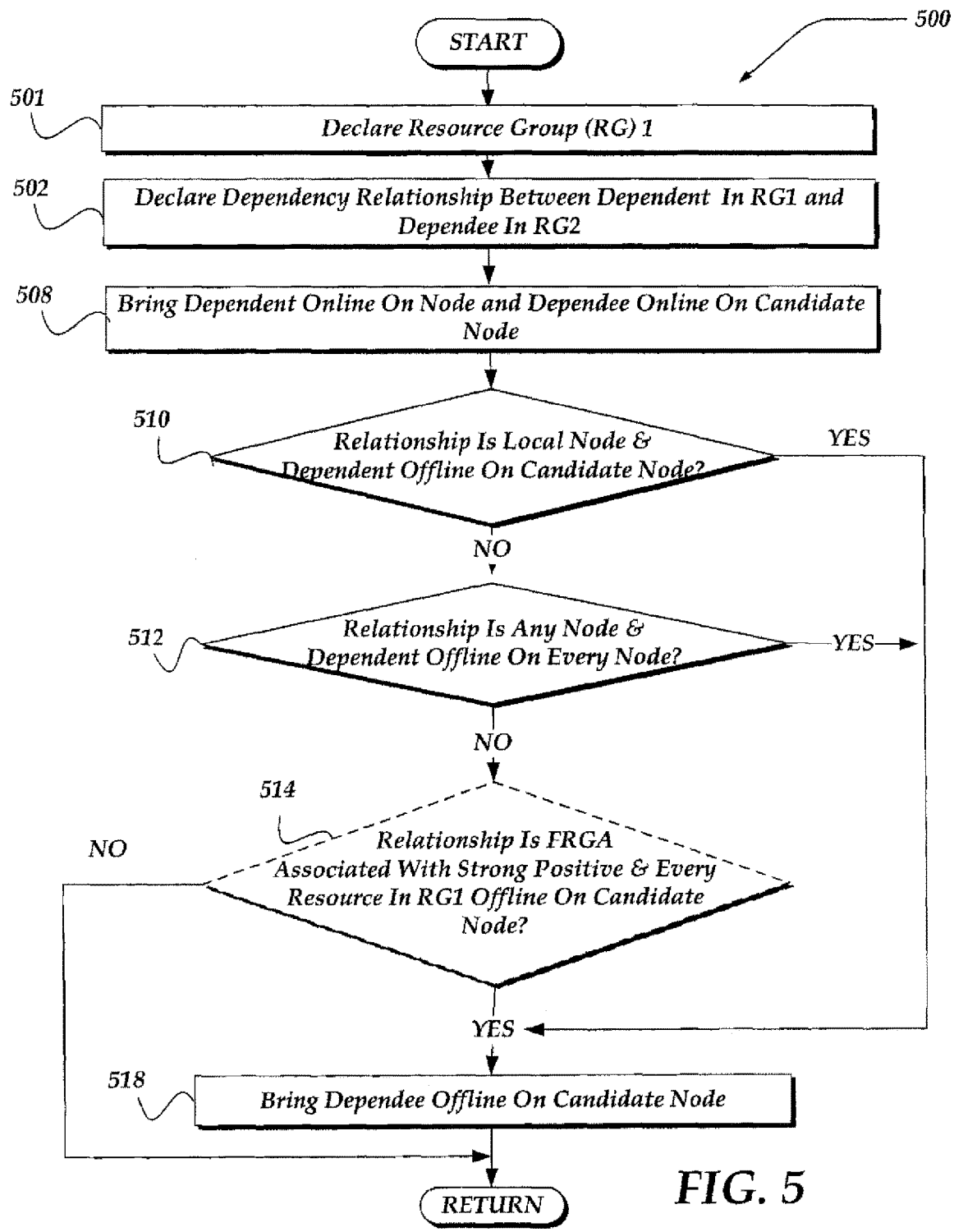
FIG. 5 illustrates another logical flow diagram generally showing one embodiment of a process for managing dependency relationships between resources in a cluster.

FIG. 5 illustrates another logical flow diagram generally showing one embodiment of a process for managing dependency relationships between resources in a cluster and for bringing a resource offline. Process 500 of FIG. 5 might be implemented, for example, within nodes 104-106 of FIG. 1.

Process 500 begins, after a start block, at block 501, where the first resource group might be declared. The first resource group might be declared as described in block 401 of process 400. Processing next continues to block 502, where at least one dependency relationship is declared between a dependent in a resource group and a dependee in a second resource group. The dependency relationships might be declared as described in blocks 402 of process 400. Processing then continues to block 508 where the dependent is brought online on a node and the dependee is brought online on a candidate node (or the same node as the dependent). Processing then continues to decision block 510.

At decision block 510, it is determined if the relationship between the dependent and dependee is a Local Node relationship and if the dependent has been brought offline on the candidate node. If relationship is a Local Node relationship and the dependent has been brought offline on the candidate node, then the relationship is determined to be unsatisfied (i.e., failed to be satisfied), and processing continues to block 518, where the dependee is brought offline. Otherwise, processing continues to decision block 512.

At decision block 512, it is determined if the relationship between the dependent and dependee is an Any Node relationship and if the dependent has been brought offline on every node. If relationship is an Any Node relationship and the dependent has been brought offline on every node, then processing continues to block 518, where the dependee is brought offline. Otherwise, processing continues to decision block 514.

At decision block 514, it is determined if the relationship is a FRGA relationship associated with an RGA that is a strong positive affinity, and if dependent has been brought offline on the candidate node. If the relationship is the appropriate type, and the dependent is offline, then processing continue to block 518. Otherwise, processing continues to other processing and/or loops back to decision block 510, 512, and/or 514 until one of these decision blocks is satisfied.

At block 518, the dependent is brought offline or otherwise deactivated on the candidate node. Processing then continues to other processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative User Interface

Figure 6:
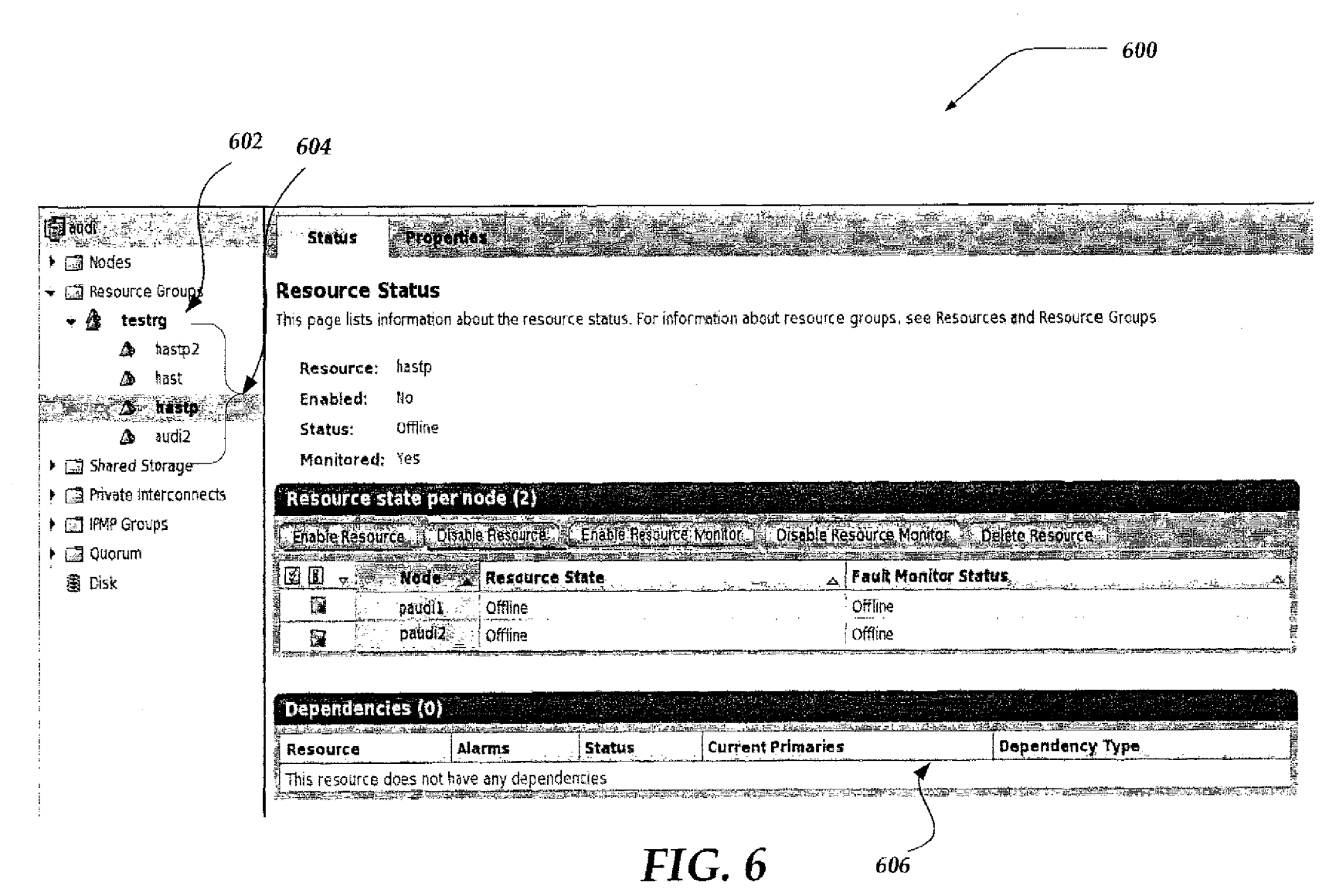
Figure 7:
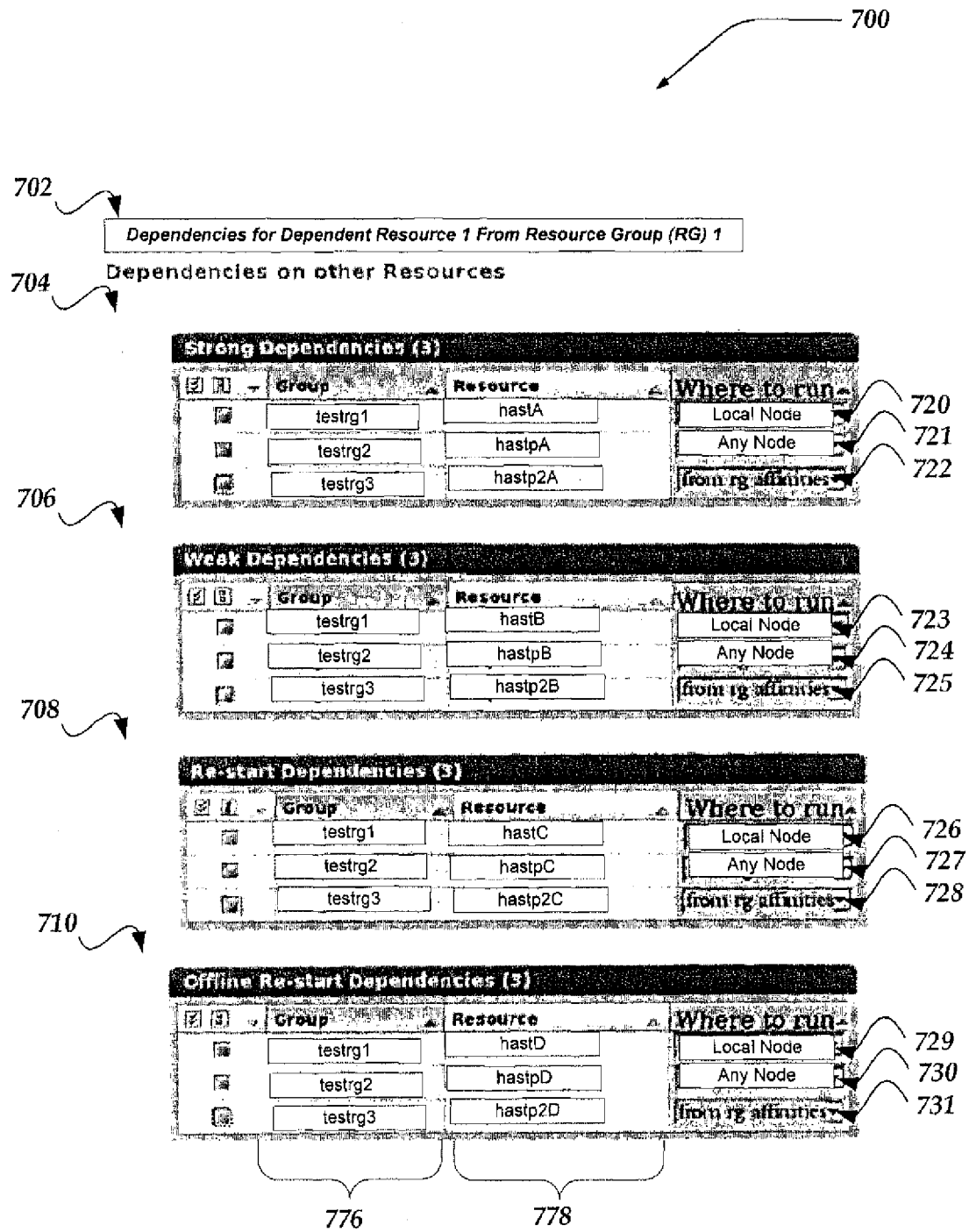

FIGS. 6-7 illustrate example embodiments of graphical user interfaces useable for managing dependency relationships between resources in a cluster. As shown, interface 600 shows a drop down list with various resource group, including resource group 602. Resource group 602 includes several resources 604. Each one of resources 604 might have dependency relationships declared. The dependency relationships might be declared though text entry, check boxes, or the like in window 606. As shown, interface 600 shows that resources 604 begin with no dependencies. Interface 700 of FIG. 7 shows an example of a dependency relationship with several relationships declared. Textbox 702 declares the dependent for the dependency. The dependee group is shown in column 776, and the dependees are shown in column 778. Entry area 704, 706, 708, and 710 divides the relationship entry by time based entries (e.g., Strong dependencies, Weak dependencies, Online Restart dependencies, Offline Restart dependencies, respectively). In each of these entry areas, dependees and the type of locality relationships are defined. As shown, dependee "hastA" is declared as a Local Node dependency 720 upon the dependent. "HastpA" has an Any Node dependency 721, and "hastp2A" has a resource dependency 722. Also shown are other dependencies 723-731 for the dependent. Other dependencies 723-731 might include any of the four time-based qualifiers (i.e., weak, strong, [Online] Restart, and Offline Restart).

As shown, pulldowns 720-731 might further declare a FRGA qualifier (e.g., "from_rg_affinities"). Each FRGA qualifier might be further declared as associated with an RGA that is of a different type (not shown). In one embodiment, the type of associated RGA relationship might be a strong positive, weak positive, strong negative, or weak negative affinity relationship. In one embodiment, resource group affinities might contain various components, including the name of the resource group for which another resource group holds an affinity, the affinity type, and the affinity strength.

In one embodiment, a positive resource group affinity indicates that the clustering software should attempt to activate a given resource group on a node that is a current master of another resource group. A strong positive affinity, e.g., RG1 holds a strong positive affinity for RG2, is an affinity where RG1 runs on nodes where RG2 is also running. In other words, RG1 and RG2 should have the same master. If no such node is available, then RG1 remains offline. A weak positive affinity, e.g., RG1 holds a weak positive affinity for RG2, indicates that the clustering software should attempt activation of RG1 on a node where RG2 is running, but if this attempt fails, then RG1 might be activated on a node that violates the weak affinity.

In contrast, a negative resource group affinity might specify that the clustering software should attempt to activate a resource group on a node that is not a current master of another resource group. A strong negative affinity, e.g., RG1 holds a strong negative affinity for RG2, is an affinity where RG1 runs on nodes where RG2 is not running. If this is not possible, then RG1 might remain offline.

A weak negative affinity, e.g., RG1 holds a weak negative affinity for RG2, indicates that the clustering software should attempt to activate RG1 on a node where RG2 is not running, but if this attempt fails, RG1 might be activated on a node where RG2 is currently running. An attempt to activate a resource group might include directing an operating system to begin a service/resource, or the like, and/or monitoring to see if the service has started or an error condition has occurred, or the like. If the resource has not been brought online successfully, then the attempt is determined to have failed.

In one embodiment, interfaces 600 and 700 might read and/or write at least some resource/dependency information on processor readable media, such as on media 800A and 800B of FIGS. 800A and 800B. Although interfaces 600 and 700 show one type of interface, other types of interface, such as web pages, command line interfaces, or the like, might be used without departing from the scope of the invention.

Illustrative Processor Readable Media

Figure 8A:
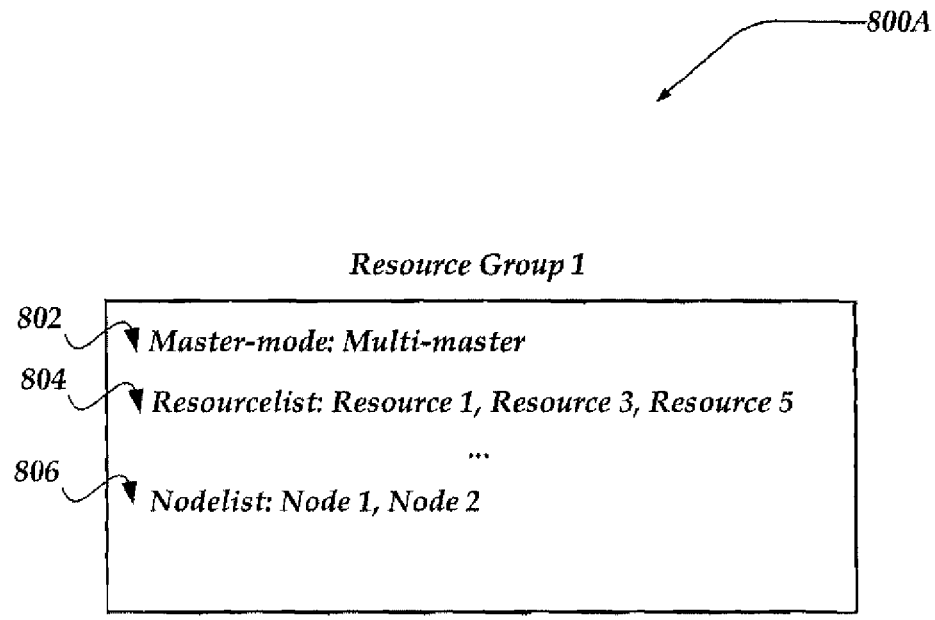
FIGS. 8A and 8B illustrates examples of embodiments of media for managing resource groups.
Figure 8B:
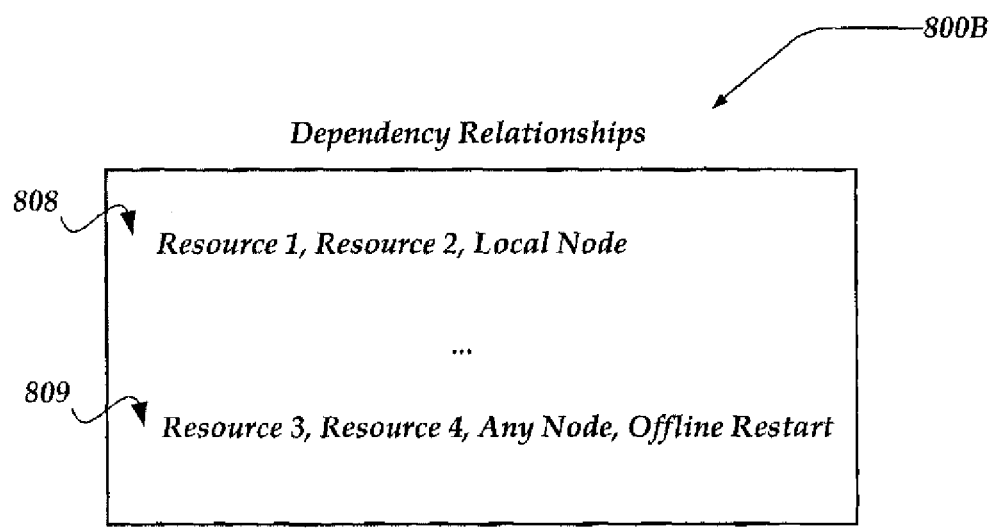

FIGS. 8A and 8B illustrates examples of embodiments of media for managing resource groups. Media 800A and 800B might be stored on any type of media, including on a disk, in a configuration file, property list, markup file (e.g., HTML, XML file), a database, or the like. Media 800A includes a resource declaration for a resource group (e.g., resource group 1). Media 800A includes a master-mode 802 which might specify whether a resource of a resource group might be online on one or more than one nodes. Resourcelist 804 includes identities of at least one resource in the resource group. Nodelist 806 includes identities of at least one node on which to bring the resource group online. Dependency relationships 808-809 of media 800B illustrate declared relationships between two resources (a dependent, and a dependee), a locality based qualifier and/or a time based qualifier, or the like. Media 800A and 800B might be used by, for example, process 400 and/or 500 to manage at least one resource on at least one node in a cluster. While the data of media 800A and 800B are shown as rows in processor readable media, the data might be stored in other configurations without departing from the scope of the invention.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method for configuring a dependency relationship between resources in a cluster, comprising:
   declaring at least one relationship for a dependent resource in a first resource group,
      wherein the at least one relationship includes a Local Node dependency relationship between the dependent resource in the first resource group and a first dependee resource in a second resource group, and
      wherein the at least one relationship further includes an Any Node dependency relationship between the dependent resource in the first resource group and a second dependee resource in the second resource group;
   determining a candidate node on which to activate the first resource group;
   satisfying the Local Node dependency relationship for an instance of the dependent resource, if an instance of the first dependee resource is online on the candidate node;
   satisfying the Any Node dependency relationship for the instance of the dependent resource, if an instance of the second dependee resource is online on any node in the cluster;
   performing a check, after declaring, to determine if every relationship between every resource in the first resource group and any other resource maintains a directed acyclic relationship; and
   activating, based on the check succeeding, the instance of the dependent resource on the candidate node, if every relationship of the at least one relationship is satisfied.

2. The method of claim 1, wherein declaring further comprises:
   receiving the at least one relationship from a graphical user interface, a property list, a configuration file, a configuration repository, or a command line interface; and
   encoding the at least one relationship on a processor readable medium, wherein the at least one relationship includes information about the dependent resource, at least one dependee resource, and a locality based relationship qualifier.

3. The method of claim 1, further comprising:
declaring an identity for every resource in the first resource group, wherein an instance of every resource in the first resource group is configured to be online on a same node.

4. The method of claim 1, further comprising:
failing to satisfy the Local Node dependency relationship for the first dependee resource, if the dependee resource is offline on the candidate node; and
failing to satisfy the Any Node dependency relationship for the second dependee resource, if the dependee resource is offline on every node in the cluster.

5. A non-transitory computer readable medium comprising instructions which, when executed by a processor, perform a method for configuring a dependency relationship between resources in a cluster, comprising:
declaring at least one relationship for a dependent resource in a first resource group,
wherein the at least one relationship includes a Local Node dependency relationship between the dependent resource in the first resource group and a first dependee resource in a second resource group, and
wherein the at least one relationship further includes an Any Node dependency relationship between the dependent resource in the first resource group and a second dependee resource in the second resource group;
determining a candidate node on which to activate the first resource group;
satisfying the Local Node dependency relationship for an instance of the dependent resource, if an instance of the first dependee resource is online on the candidate node;
satisfying the Any Node dependency relationship for the instance of the dependent resource, if an instance of the second dependee resource is online on any node in the cluster;
performing a check, after declaring, to determine if every relationship between every resource in the first resource group and any other resource maintains a directed acyclic relationship; and
activating, based on the check succeeding, the instance of the dependent resource on the candidate node, if every relationship of the at least one relationship is satisfied.

6. The non-transitory computer readable medium of claim 5, wherein declaring further comprises:
receiving the at least one relationship from a graphical user interface, a property list, a configuration file, a configuration repository, or a command line interface; and
encoding the at least one relationship on a processor readable medium, wherein the at least one relationship includes information about the dependent resource, at least one dependee resource, and a locality based relationship qualifier.

7. The non-transitory computer readable medium of claim 5, further comprising instructions for:
declaring an identity for every resource in the first resource group, wherein an instance of every resource in the first resource group is configured to be online on a same node.

8. The non-transitory computer readable medium of claim 5, further comprising instructions for:
failing to satisfy the Local Node dependency relationship for the first dependee resource, if the dependee resource is offline on the candidate node; and
failing to satisfy the Any Node dependency relationship for the second dependee resource, if the dependee resource is offline on every node in the cluster.

* * * * *

UNITED STATES PATENT AND TRADEMARK OFFICE
CERTIFICATE OF CORRECTION

PATENT NO. : 9,722,870 B2  
APPLICATION NO. : 14/543665  
DATED : August 1, 2017  
INVENTOR(S) : Martin H. Rattner et al.

Page 1 of 2

It is certified that error appears in the above-identified patent and that said Letters Patent is hereby corrected as shown below:

On the Title Page

Item (71) Applicant:, "Oracle International Corporation" should read -- Oracle America, Inc. --.

Under OTHER PUBLICATIONS, Line 3, "Wesbourne," should read -- Westbourne, --.

In the Drawings

Fig. 3, Sheet 4 of 9, reference numeral 354 labeled "User Interface Manger (UIM)" should read -- User Interface Manager (UIM) --.

In the Specification

Column 1, beginning on Line 13 and ending on Line 14, "U.S. patent application Ser. No. 1114/777,184 is Hereby incorporated..." should read -- U.S. patent application Ser. No 11/777,184 is hereby incorporated... --.

Column 5, Line 37, "Mobil" should read -- Mobile --.

Column 8, Line 65, a -- . -- should be inserted after the word "like", before the word "In".

Column 12, Line 41, the (,) between the word "like" and "RGM", should be a (.).

Column 12, Line 61, "ROM" should read -- RGM --.

Column 13, Line 1, "ROM" should read -- RGM --.

Column 13, Line 15, the word "cheek" should read -- check --.

Signed and Sealed this  
Eighteenth Day of June, 2019

Andrei Iancu  
*Director of the United States Patent and Trademark Office*

CERTIFICATE OF CORRECTION (continued)
U.S. Pat. No. 9,722,870 B2

Column 13, Line 37, the (,) between the word "online" and "RGM", should be a (.).

Column 14, Line 59, the (,) between the number "4" and the word "Media", should be a (.).